May 15, 1962　　J. W. CROWNOVER　　3,035,126
TRANSDUCER
Filed Dec. 27, 1957
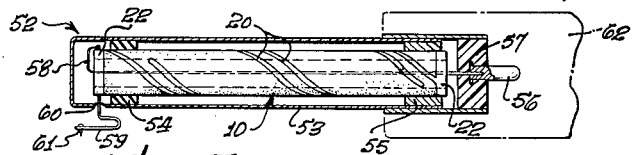
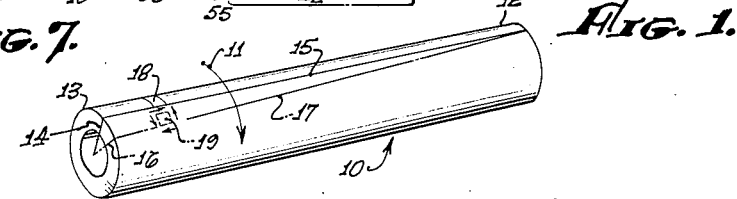
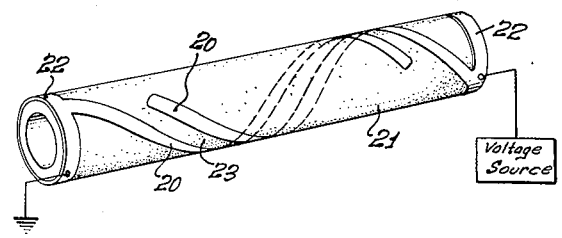
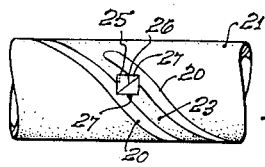
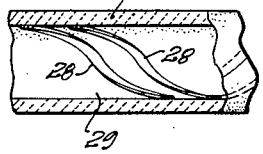
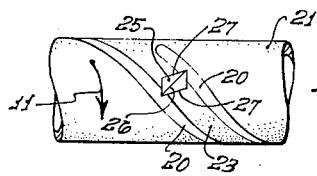
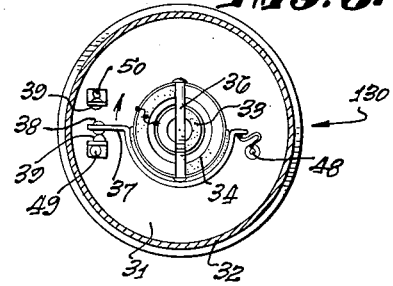
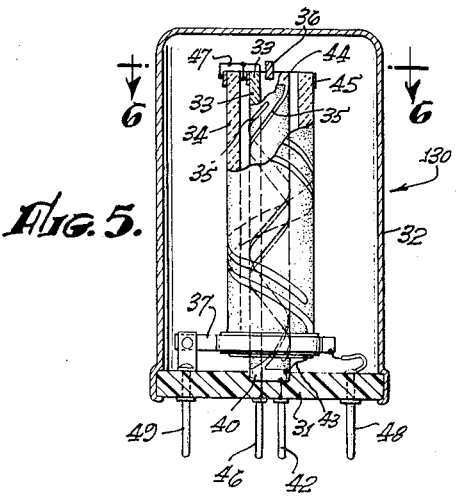
JOSEPH W. CROWNOVER,
INVENTOR.
BY William W. Haefliger
ATTORNEY.

3,035,126
TRANSDUCER
Joseph W. Crownover, 1037 Scarlatti Place, La Jolla, Calif., assignor of twenty-five percent to William W. Haefliger, Pasadena, Calif.
Filed Dec. 27, 1957, Ser. No. 705,687
7 Claims. (Cl. 179—100.41)

This invention relates generally to actuators of the electro-mechanical transducer type, and more particularly has to do with an improved actuator capable of twisting about its axis in response to application of voltage to actuator electrodes, or conversely to produce voltage at the electrodes upon application of twisting loads to the actuator.

It is a major object of the invention to provide an electrostrictive ceramic actuator formed in cylindrical shape so as to be capable of twisting about its major axis, the actuator having novel electrode configurations formed thereon in such relation to each other and the cylindrical ceramic that voltage applied to the electrodes will create stresses in the ceramic material corresponding to those produced when the actuator is mechanically twisted, so that the voltage produced stresses will result in actuator deformation actually amounting to twisting thereof.

In carrying out the invention, the actuator is preferably formed of an electrostrictive or piezoelectric ceramic material such as barium or strontium titanate and shaped in the form of a cylinder typically tubular and relatively thin-walled. A pair of spaced relatively narrow electrodes are applied to the inside or outside surface of the finished cylinder, the electrodes extending longitudinally thereof and winding about the cylinder axis preferably at substantially equal helix angles while remaining at constant relative spacing.

Each electrode also encircles one end of the cylinder to accommodate a convenient electrical terminal connection, and when a voltage differential is applied across the electrodes they become relatively charged to effect a degree of electrically induced molecular alignment of the ceramic material between the electrodes. As a result of the electrostrictive properties of the material, such molecular orientation produces mechanical expansion of the ceramic strip between the electrodes in the direction of tangents to the cylinder extending normal to the electrodes, and the particular expansion occurring at different cylinder portions related in a winding sense duplicates that expansion which naturally results when the cylinder is forcibly twisted about its axis. Thus, application of voltage to the winding electrodes effects a mechanical twisting of the cylinder.

Further objects of the invention concern the provision of a novel relay incorporating one or more of the above described actuators, in which relative twist of opposite ends of the actuator cylinder is utilized to provide desired movement of a relay contact, and the provision of an advantageously compact and rugged phonograph pick-up assembly including a phonograph needle support arranged for transmitting twist to the novel actuator in response to excursions of the needle upon a phonograph record, so as to produce a proportional voltage output at the pair of actuator electrodes.

These and other objects of the invention will be more fully brought out with greater detail in the following description of an illustrative embodiment of the invention shown in the drawing, in which:

FIGURE 1 is a perspective view of a cylinder showing its deformation upon mechanical twisting;

FIGURE 2 shows a complete actuator made in accordance with the present invention;

FIGURE 3a illustrates a portion of the FIG. 2 actuator before application of voltage to the electrodes;

FIGURE 3b illustrates the same actuator portion after application of voltage;

FIGURE 4 is a sectional view of a modified form of the actuator;

FIGURE 5 is an elevation taken in section through a relay assembly incorporating two twister type actuators;

FIGURE 6 is a section taken on line 6—6 of FIG. 5; and

FIGURE 7 is a section taken through a novel phonograph pickup assembly incorporating the actuator of FIG. 2.

In FIGURE 1 a cylinder 10 capable of twisting in response to torque applied about its major axis in the direction of arrow 11 is shown to illustrate what deformation occurs during twist. Assuming cylinder ends 12 and 13 are respectively held and free to rotate, a radial axial plane designated by radius 14 and longitudinal line 15 becomes displaced to broken line position 16 and 17 during twisting of end 13 in the direction of arrow 11. Also, segment 18 one side of which runs along line 15 becomes strained to the broken line parallelogram position 19 adjacent longitudinally angled line 17, the four small arrows at the four sides of the segment indicating the directions of shearing stresses existing at the segment sides. Since these stresses exist when the cylinder is twisted, it follows that independent creation of the stresses should cause the cylinder to twist in response.

For generation of these stresses associated with cylinder twist, two relatively narrow helical bands 20 of silver or other suitable electroding material are applied to the surface of an electrostrictive ceramic cylinder 21 so that the bands run parallel to one another in winding about the cylinder axis yet remain narrowly separated, as shown in FIGURE 2. One spiral band joins a ring-shaped silver band 22 at one end of the cylinder while the other band connects with a similar band 22 at the opposite cylinder end, these bands providing suitable connections for snap-on or other type terminals.

In FIGURES 3a and 3b, illustrating relative band and ceramic displacement respectively before and after application of voltage differential to the two bands, it is seen that the bands and ceramic therebetween tend to separate, widening the intermediate zone 23. The ceramic expands in the mode or direction normal to the electrodes and tangent to the cylinder, while contracting in directions at right angles to the normal, or parallel to the electrodes. That the cylinder undergoes resultant mechanical twist is shown by the deformation resulting to an originally substantially rectangular segment 25 on the cylinder, of which a diagonal 26 runs between the electrodes in the normal mode, opposite sides 27 of the segment extending in axial planes. The segment deforms to the position shown in FIG. 3b in response to electrostrictively induced separation of the electrodes, diagonal 26 lengthening and segment sides warping to parallelogram pattern as in FIG. 1, indicating the presence of cylinder twisting stresses.

FIGURE 4 shows the application of narrowly spaced silver bands or electrodes 28 to the inner surface 29 of an electrostrictive ceramic cylinder 30 for the same purpose, and it is also contemplated that two axially spaced bands may be applied respectively to the inside and outside of a relatively thin ceramic cylinder with substantially equal effectiveness.

A typical relay assembly 130 is shown in FIGS. 5 and 6 to include a base 31 mounting a shell 32 containing two upright electrostrictive ceramic cylinders 33 and 34 mounted for twisting displacement. The lower end of inner cylinder 33 is fastened to base 31 so that its upper end is free to twist in response to application of voltage to its electrodes 35, the upper end of the inner cylinder 33 being keyed to the upper end of the outer cylinder at 36 and the lower end of the outer cylinder being free to twist in relation to its upper end. A support 37 carrying an electrical contact 38 between two fixed contacts 39 is mounted on the outer cylinder lower end to twist therewith for contacting the fixed contacts.

Voltage applied to the two end bands 40 and 41 of the cylinders through terminal 42 and lead 43, while being applied to the upper end bands 44 and 45 through terminal 46 and lead 47 running up through the inner cylinder effects twisting of the cylinders in the same direction about their axes. Thus, doubling of the cylinders permits greater twisting displacement of movable contact 38, giving improved relay action.

Without the relay being energized, movable contact 38 engages fixed contact 39 for passage of current through support 37 from terminal 48, and then through the two contacts to terminal 49. Upon relay energization, contact 38 is displaced to engage the other fixed contact for passing current to the remaining terminal 50.

A phonograph pickup assembly or cartridge 52 incorporating the actuator 10, for the purpose of generating small voltages in response to excursions of a phonograph needle on a record proportionally transmitted to the actuator as twisting displacements, is illustrated in FIGURE 7. As therein shown, the actuator is carried within a tubular shell or case 53 by a soft rubber ring 54 acting merely to center the free end of the actuator, and by a stiff conductor ring 55, typically metallic, centering the opposite end of the actuator, retaining it against axial twist, and effectively grounding end band 22 to the case 53.

Connecting the free end band 22 with the external output pin 56 mounted on the end insulator 57 is a wire 58 running through the tubular actuator, as shown, so that the signal output is developed between pin 56 and case 53.

Also rigidly connected with the free end of the actuator is a phonograph needle support 59 projecting downward through an opening 60 in the case, for suspending the needle 61 below the case. Transverse excursions of the needle on a record with respect to the actuator axis are proportionally transmitted to twist the actuator free end about that axis, and since twist is resisted by the fixed opposite actuator end, the torque strains the actuator to cause development of proportional voltages across the electrodes 20, and appearing as a signal between pin 56 and the case.

The cartridge may readily be endwise inserted in and removed from the phonograph arm 62, to facilitate convenient replacement, by virtue of the plug-in pin and socket connection shown.

One important characteristic of the invention pertains to the polarity of the output potential as a function of primary importance when applying the invention to phonograph pickup cartridges, since the later excursions of the phonograph needle of a pickup cartridge must be faithfully transformed into an equivalent potential. In other words, a positive and negative torsional stress must produce a positive and negative potential respectively across the two electrodes.

By using helical electrodes on a ceramic tube, a clockwise application of torsional stress, for a given helical electrode winding on a given ceramic tube, will generate a potential with a given polarity, whereas a counterclockwise application of torsional stress on the same ceramic tube will generate a potential with opposite polarity. Furthermore, the potentials will remain approximately proportional to applied stress, and a rectangular co-ordinate graph of stress versus potential will approximate a straight line passing through the origin.

On the other hand, if the electrodes are not helical but longitudinally straight, both clockwise and counterclockwise application of stress will produce a potential of the same polarity, and a graph of stress versus potential will approximate two straight lines which meet at the co-ordinate origin and are symmetric reflections of one another with respect to the stress axis. Therefore, the potential outputs produced by reverse applications of torsional stress will be distorted.

I claim:

1. An electro-mechanical transducer, comprising a substantially cylindrical body of electrostrictive ceramic material, and a pair of spaced electrodes extending longitudinally on the body and winding about the axis thereof so that twisting of the body about said axis is accompanied by a voltage change across said electrodes, said body being lengthwise continuous.

2. An electro-mechanical transducer, comprising a substantially cylindrical body of electrostrictive ceramic material, and a pair of relatively narrow spaced electrodes extending longitudinally on the body and winding about the axis thereof while remaining at substantially constant spacing so that twisting of the body about said axis is accompanied by a voltage change across said electrodes, said electrodes being in the same curved plane defined by a surface of said body.

3. An electro-mechanical transducer, comprising a substantially cylindrical body of electrostrictive ceramic material, and a pair of relatively narrow spaced helical electrodes extending longitudinally on the body and winding about the axis thereof while remaining at substantially constant spacing so that twisting of the body about said axis is accompanied by a voltage change across said electrodes, said electrodes being in the same curved plane defined by a surface of said body.

4. An electro-mechanical transducer, comprising a tube of electrostrictive ceramic material, and a pair of relatively narrow spaced helical electrodes extending longitudinally on the tube and winding about the axis thereof at substantially equal helix angles while remaining at substantially constant spacing so that twisting of the tube about said axis is accompanied by voltage change across the electrodes, said body being lengthwise continuous.

5. An electro-mechanical transducer, comprising a substantially cylindrical body of electrostrictive ceramic material, and a pair of spaced electrodes on the body each including an end portion near one end of the body and an intermediate portion extending longitudinally of the body and winding about the axis thereof so that twisting of the body about said axis is accompanied by a voltage change across said electrodes, said body being lengthwise continuous.

6. An electro-mechanical transducer, comprising a substantially cylindrical body of electrostrictive ceramic material, and a pair of spaced electrodes on the body each including an end portion near one end of the body and an intermediate relatively narrow portion extending longitudinally of the body, said electrodes winding about the body axis while remaining at substantially constant spacing so that twisting of the body about said axis is accompanied by a voltage change across said electrodes, said electrodes being in the same curved plane defined by a surface of said body, and said body being lengthwise continuous.

7. An electro-mechanical transducer, comprising a tube body of electrostrictive ceramic material, and a pair of spaced electrodes on the tube each including a ring shaped end portion near one end of the tube and an intermediate relatively narrow helical portion extending longitudinally of the tube, said electrodes winding about the body axis at a substantially constant helix angle while remaining at substantially constant spacing so that twisting of the tube about said axis is accompanied by a voltage change across said electrodes, said electrodes being in the same curved plane defined by a surface of said body, and said body being lengthwise continuous.

(References on following page)

References Cited in the file of this patent
UNITED STATES PATENTS

| | | |
|---|---|---|
| 2,201,879 | Blattner et al. | May 21, 1940 |
| 2,486,560 | Gray | Nov. 1, 1949 |
| 2,587,482 | Keller | Feb. 26, 1952 |
| 2,596,494 | Lynch | May 13, 1952 |
| 2,614,143 | Williams | Oct. 14, 1952 |
| 2,625,663 | Howatt | Jan. 13, 1953 |
| 2,838,696 | Thurston | June 10, 1958 |
| 2,928,069 | Petermann | Mar. 8, 1960 |

UNITED STATES PATENT OFFICE
CERTIFICATE OF CORRECTION

Patent No. 3,035,126                        May 15, 1962

Joseph W. Crownover

It is hereby certified that error appears in the above numbered patent requiring correction and that the said Letters Patent should read as corrected below.

Column 3, line 56, before "primary" insert -- the applied stress, and is of --; same column, line 57, for "later" read -- lateral --.

Signed and sealed this 11th day of September 1962.

(SEAL)
Attest:

ERNEST W. SWIDER                          DAVID L. LADD
Attesting Officer                            Commissioner of Patents